UNITED STATES PATENT OFFICE.

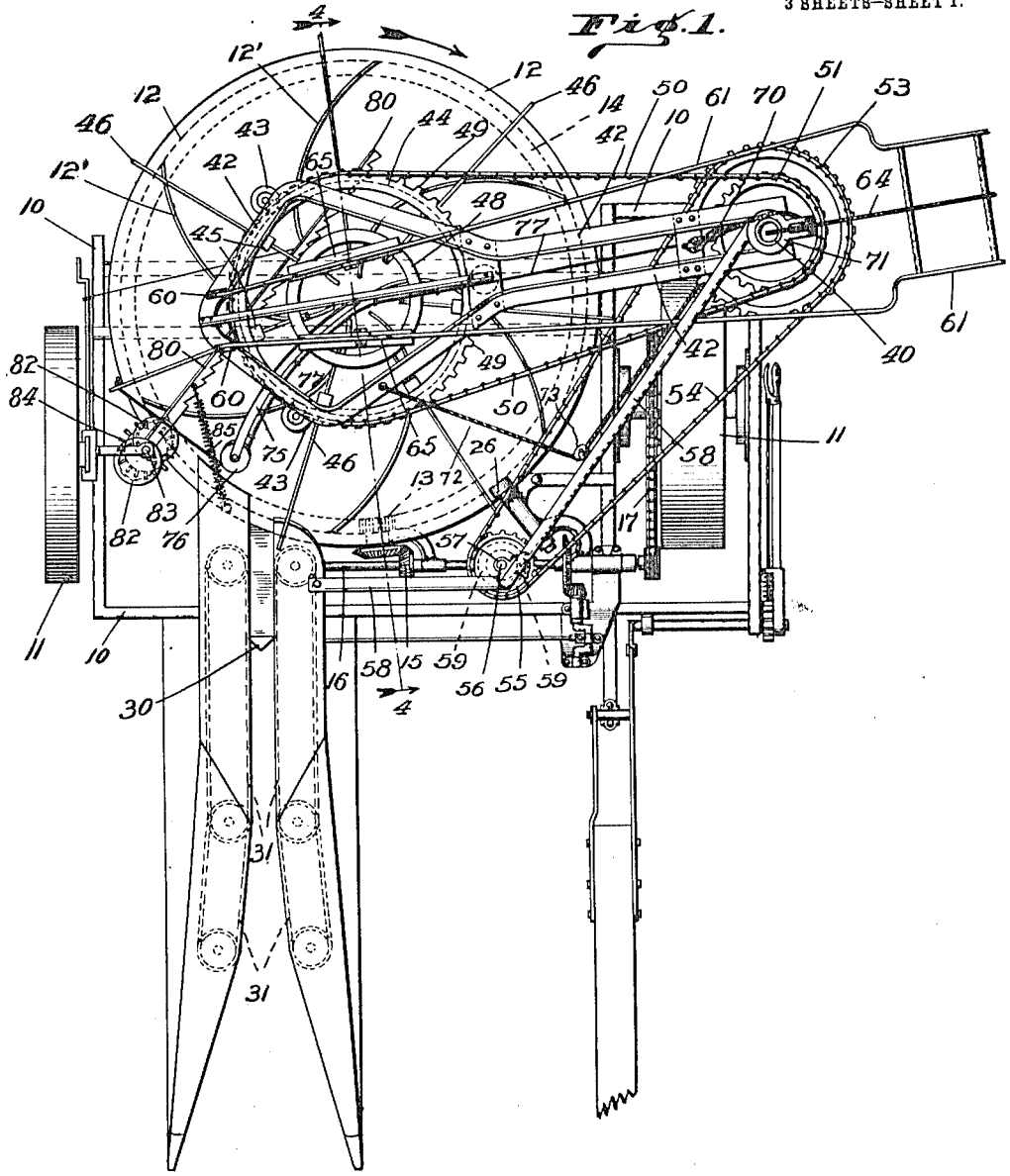

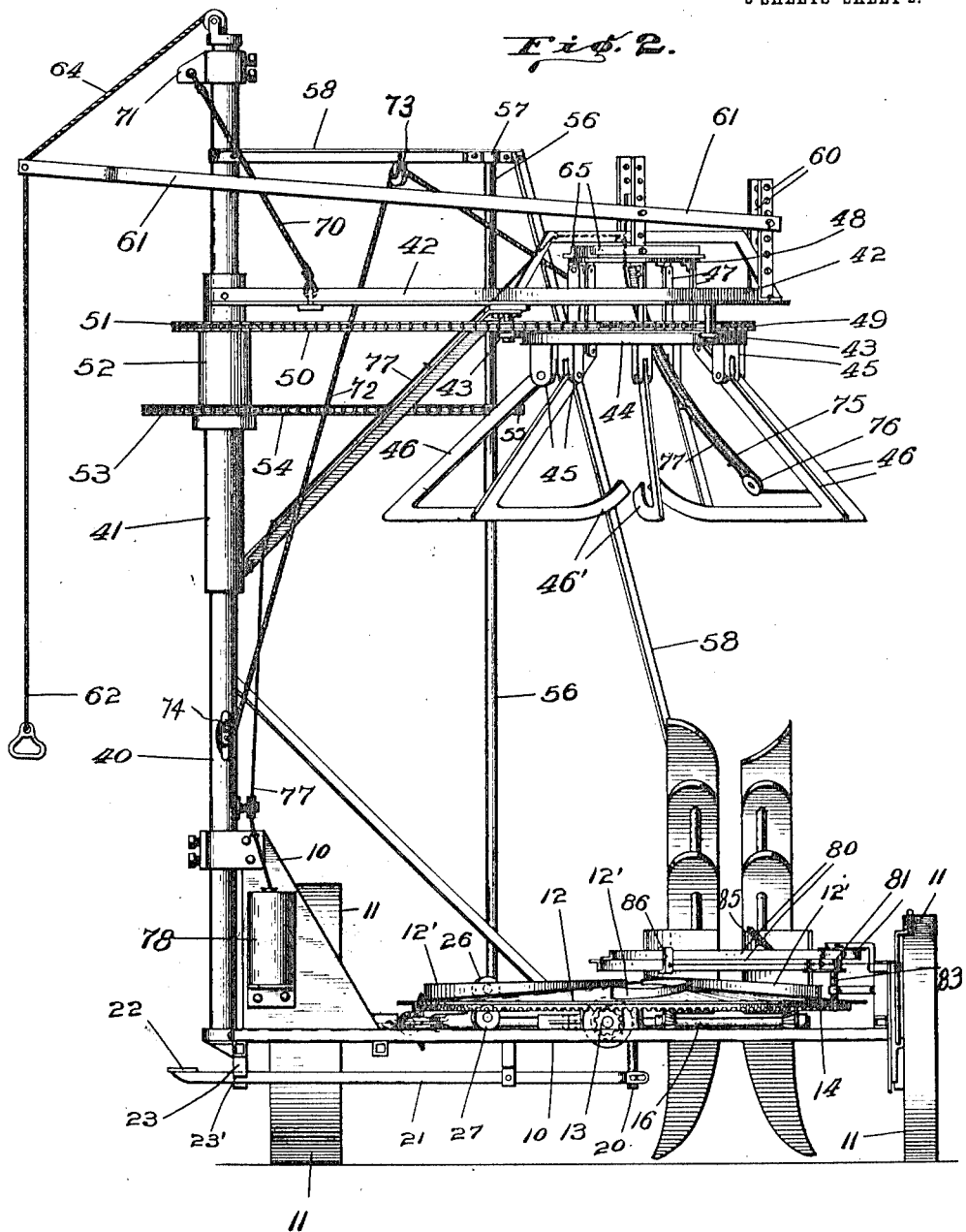

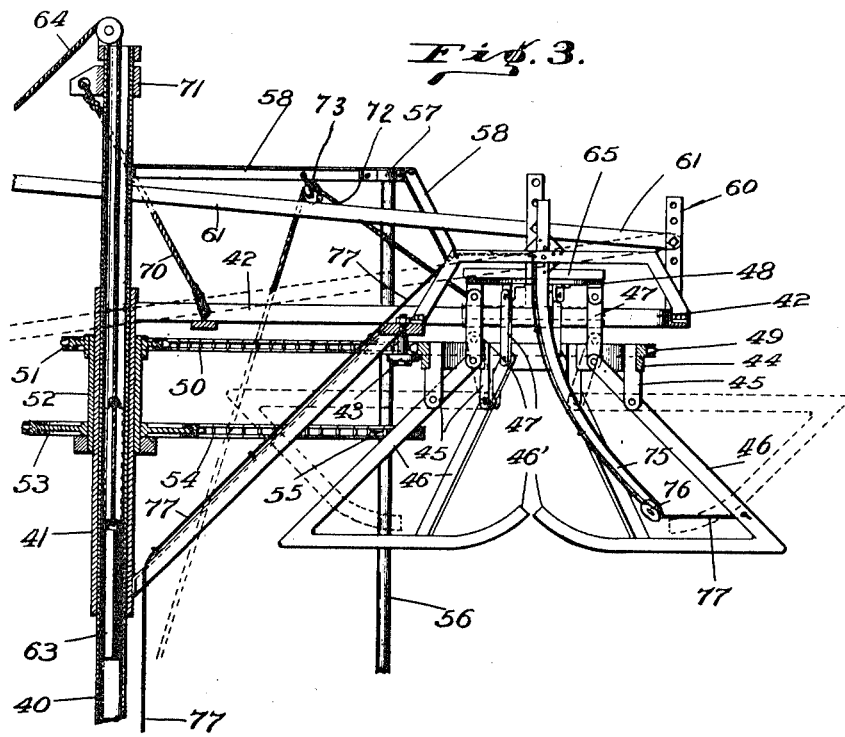
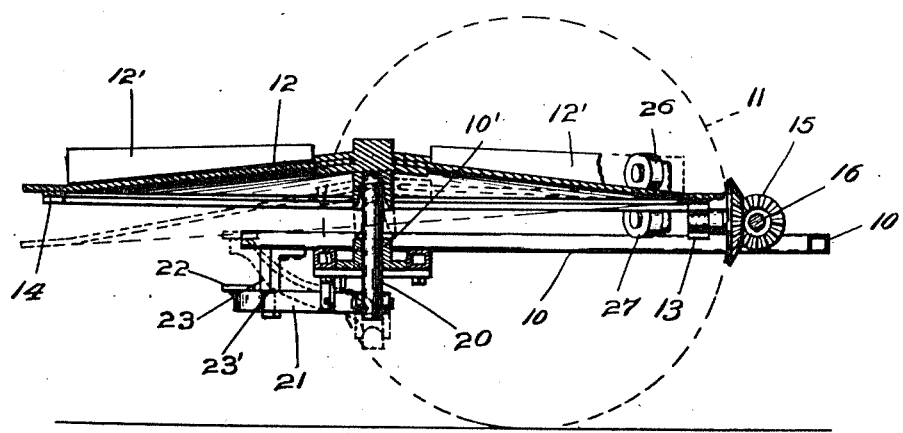

ARTEMUS N. HADLEY, OF INDIANAPOLIS, INDIANA.

STALK-HARVESTER.

1,061,473. Specification of Letters Patent. Patented May 13, 1913.

Application filed July 6, 1906. Serial No. 324,940.

*To all whom it may concern:*

Be it known that I, ARTEMUS N. HADLEY, a citizen of the United States, residing at Indianapolis, in the county of Marion and State of Indiana, have invented certain new and useful Improvements in Stalk-Harvesters, of which the following is a specification.

The object of my invention is to produce a machine by means of which corn or other stalk crops may be cut and automatically formed into a shock, and whereby the shock may be easily handled, the construction being such that the formed shock may be readily discharged without lifting it from the machine and placed upon the ground in an upright position.

The accompanying drawings illustrate my invention.

Figure 1 is a plan of a machine embodying my improvements; Fig. 2 a rear elevation; Fig. 3 a detail of a support for the upper ends of the stalks; Fig. 4 a section on a larger scale on line 4—4 of Fig. 1.

In the drawings, 10 indicates a suitable supporting framework carried by suitable supporting wheels 11 11. Rotatably mounted on the frame 10 is a rotary shock-forming table 12 which is rotated, preferably continuously at a comparatively low speed, during the formation of a shock. Table 12 may be rotated by any suitable means as for instance a gear 13 meshing with a series of teeth 14 formed on the under side of the table near its edge, the gear 13 being driven by means of a gear 15 and by a shaft 16 journaled on the main frame 10 and driven by a chain 17 from the main supporting wheel 11. Of course any other train of gearing for driving the table 12 may be substituted without departing from my invention.

In order that the shock may be formed with a hollow coned base, so as to improve the form of the shock and facilitate its deposit upon the ground, I prefer to crown the table 12 or construct it with a substantially conical upper face. Such a construction of the table requires the shock to be separated from the table before it can be swung transversely therefrom, and I, therefore, prefer to so support the table that it may be dropped sufficiently to carry the table away from the base of the formed shock. In order to do this I support the table at its center so as to be lowered, preferably upon a vertically movable pivot pin 20 which may be moved up and down and held in position by any suitable means. A convenient construction is that shown in Fig. 4 where the pivot pin 20 is guided in a bearing 10' of the frame 10 and supported by one end of a lever 21 pivotally supported on the frame 10 and provided at its outer end with a foot piece 22, the lever 21, at an intermediate point, being arranged to be swung under a shoulder 23' of a bracket 23 carried by the frame 10. In order to further support the table I provide a pair of idlers 26 and 27 between which the edge of the table passes, said idlers being arranged near the forward edge of the table adjacent the gear 13.

Arranged immediately in front of the forward edge of the table 12 is a suitable stalk-cutting mechanism 30 and suitable gathering chains 31 may form a passage for the stalks to the cutting mechanism and from thence to the table. The table 12 is provided on its upper face with flanges 12' which are of sufficient height to prevent the butts of the stalks from slipping circumferentially around the table, the flanges being approximately radial.

In the production of a shock it is necessary that the stalks be supported laterally at a point above the table and that the support move rotatably in substantial unison with the table. In my present machine I utilize such support as a means by which to bodily support and transfer the formed shock from the table to the ground, and to this end I mount upon frame 10, adjacent the table 12, a vertical mast 40. Sleeved upon mast 40 is a sleeve 41 which carries a cross arm 42 which at its outer end is widened and carries on its under side a series of rollers 43. The rollers 43 form a support for a ring 44 provided at various points with hangers 45 in each of which is pivoted a controllable arm 46 which, at its lower end is provided with a finger 46' preferably curved slightly upward at its end. The short inner end of each arm 46 carries an upwardly extending link 47, and the several links are pivoted to downwardly projecting ears carried by a ring 48. Ring 44 is provided on its circumference with sprocket teeth 49 adapted to receive a chain 50 which also passes around a sprocket wheel 51 carried by a sleeve 52 journaled on the sleeve 41. Sleeve 52 also carries a sprocket wheel 53 which receives a chain 54, which chain passes around a sprocket wheel 55 carried by a shaft 56 journaled at its lower end in frame 10, and at its upper end in a bearing 57 carried at the apex of a pair of braces 58. Shaft 56 is driven by suitable gears 59 from shaft 16 (or any other suitable manner) at such speed that ring 44 will be rotated substantially synchronously with the table 12.

Erected upon the outer end of cross arm 42 are standards 60 to each of which is pivoted a lever 61 which is extended back to a point beyond mast 40, the outer end of said levers being connected and provided with a rope 62 which extends to a point within easy access from the ground. The levers 61 are normally held upward in the position shown in Fig. 2 by means of a counterweight 63 arranged within mast 40 and connected to the levers 61 by means of a rope 64. Each of the levers 61 carries a foot piece 65 which lies immediately above the ring 48 so that, by pulling downward on the rope 62, ring 48 may be depressed and, through links 47, serve to swing the several arms 46 to the positions shown in dotted lines in Fig. 3, thus withdrawing the lower inwardly projecting fingers 46' from or nearly from the completed shock.

The sleeve 41 and cross arm 42 may be supported vertically on the shaft 40 in any suitable manner, but I prefer to support the same by means of a cable 70. The lower end of said cable is attached to the cross arm 42 and its other end is carried upwardly and outwardly toward the mast 40 and wrapped partially around said mast before it is attached to a collar 71 angularly adjustable on the upper end of the mast 40, the arrangement being such that the weight of the structure supported by the cable 70 will tend to cause said structure to rotate on the mast 40, swinging the outer end of the cross arm 42 toward the rear and toward discharging position. When the structure 41—42 is supported in this manner it is essential that some means be provided for holding the structure in the position shown in full lines in Figs. 1 and 2, and for that purpose I provide a cable 72 which is carried over a pulley 73 supported by brace 58 and thence to a fastener 74 within easy reach on mast 40.

In order to bind the stalks together into the shock I prefer to use the method described and claimed in my prior Patent No. 432,750, and to this end I support from the cross arm 42 an arm 75 which extends downward within the space inclosed by the arms 46, said arm being provided at its lower end with a suitable guide 76 which lies just within the path of movement of the arms 46 and their inwardly turned fingers 46'. The binding twine 77 is led from a suitable receptacle 78 upward to a point above the center of ring 48 and from thence downward through said ring and through ring 44 and around the guide 76, so that its outer end may be attached to one of the arms 46 as shown in Fig. 2.

In order to force the butts of the stalks toward the axis of rotation of the table 12 I provide, a short distance above the table, a pair of reciprocating feeder fingers or bars 80, each of which at its outer end is carried by an eccentric strap 81 which passes around an eccentric 82 carried by a shaft 83. Shaft 83 carries a pin gear 84 adapted to mesh in the ends of the teeth 14 of table 12. In the drawings I have shown the free ends of the fingers 80 yieldingly urged toward the axis of the table by means of a spring 85, one end of which is attached to the frame 10 while the other is attached to one of the fingers 80. The other finger 80 is provided with a transversely extending lug 86 which engages the spring pressed finger 80 so that a single spring 85 serves for both of the feed fingers.

The operation is as follows: When the machine is driven along the ground the stalks will be cut by the cutter 30 and the cut stalks will pass to the rear onto the table 12, the butts of the stalks being driven around with the table in the direction indicated by the arrow in Fig. 1 and the tops falling toward the axis of the table and between adjacent fingers 46'. When the table has made a complete rotation the cord 77 will have been carried around with the table so as to encompass the stalks which have been deposited upon the table at a point above the fingers 46', the table at this time being from one-fourth to one-third full. The operation is repeated until a sufficient number of stalks have been deposited upon the table, at which time the cords 77 will have been associated with the stalks in a spiral leading from its point of attachment to one of the arms 46 to the shock and thence outwardly in a spiral form, as described in my patent already referred to. The cords 77 will be then drawn as tightly as possible about the waist of the shock and its ends secured. Lever 21 will then be disengaged from the shoulder 23' so that the table may drop away from the shock, the rearward portion the farther away and at the same time cable 72 is released so that the shock will be suspended on the fingers 46' and its weight will tend to swing the cross arm 42 and sleeve 41 upon the mast 40. As soon as the shock is swung clear of the table 12 the operator will pull rope 62 so as to depress ring 48 and withdraw the fingers 46' radially from the shock, thus permitting the shock to drop upon the ground. The base of the shock being coned upwardly toward its center, the outer layers of stalks will strike the ground first, and this will facilitate the proper positioning of the shock upon the ground. As soon as the shock has been deposited the parts are returned to their normal positions and the operation repeated.

I claim as my invention:

1. In a stalk harvester, the combination, with stalk cutting means, of a rotary shock-forming table arranged to receive the cut stalks, substantially radially arranged stalk-supporting fingers above said table and independently supported, means for revolving said fingers in substantial synchronism with the table, and means for withdrawing said fingers outwardly from a shock.

2. In a stalk harvester, the combination, with stalk cutting means, of a rotary shock-forming table arranged to receive the cut stalks, substantially radially arranged stalk-supporting fingers supported above said table, means for revolving said fingers in substantial synchronism with the table, and means for withdrawing said fingers outwardly from a shock.

3. In a stalk harvester, the combination, with a stalk cutting means, of a rotary shock-forming table arranged to receive the cut stalks, a rotatable head arranged above said table, a series of movable arms carried by the head and having substantially radial inwardly projecting fingers, means for revolving said head in substantial synchronism with the table, and means for moving said arms on the head to withdraw their substantially radial fingers from a shock.

4. In a stalk harvester, the combination, with stalk cutting means, of a rotary shock-forming table arranged to receive the cut stalks, substantially radially arranged stalk-supporting fingers above said table and independently supported, means for revolving said fingers in substantial synchronism with the table, means for withdrawing said fingers outwardly from a shock, and a support for said supporting fingers whereby they may be moved away from above the table.

5. In a stalk harvester, the combination, with stalk cutting means, of a rotary shock-forming table arranged to receive the cut stalks, substantially radially arranged stalk-supporting fingers supported above said table, means for revolving said fingers in substantial synchronism with the table, means for withdrawing said fingers outwardly from a shock, and a support for said supporting fingers whereby they may be moved away from above the table.

6. In a stalk harvester, the combination, with a stalk cutting means, of a rotary shock-forming table arranged to receive the cut stalks, a rotatable head arranged above said table, a series of movable arms carried by the head and having substantially radial projecting portions movable outwardly from the shock, means for revolving said head in substantial synchronism with the table, means for moving said arms on the head to withdraw their substantially radial portions from a shock, and a support for said rotatable head whereby it may be moved away from above the table.

7. In a stalk harvester, the combination, with stalk cutting means, of a rotary shock-forming table arranged to receive the cut stalks, substantially radially arranged stalk-supporting fingers supported above said table and independent thereof, means for revolving said fingers in substantial synchronism with the table, means for withdrawing said fingers from a shock, and means for dropping the shock-forming table.

8. In a stalk harvester, the combination, with stalk cutting means, of a rotary shock-forming table arranged to receive the cut stalks, substantially radially arranged stalk-supporting fingers supported above said table, means for revolving said fingers in substantial synchronism with the table, means for withdrawing said fingers from a shock, and means for dropping the shock-forming table.

9. In a stalk harvester, the combination, with a stalk cutting means, of a rotary shock-forming table arranged to receive the cut stalks, a rotatable head arranged above said table, a series of movable arms carried by said head and having substantially radial inwardly projecting portions, means for revolving said head in substantial synchronism with the table, means for moving said arms on the head to withdraw their substantially radial portions from a shock, and means for dropping the shock-forming table.

10. In a stalk harvester, the combination, with stalk cutting means, of a rotary shock-forming table arranged to receive the cut stalks, substantially radially arranged stalk-supporting fingers supported above said table and independent thereof, means for revolving said fingers in substantial synchronism with the table, means for withdrawing said fingers from a shock, means for moving said supporting fingers away from above the table, and means for dropping the shock-forming table.

11. In a stalk harvester, the combination, with stalk cutting means, of a rotary shock-forming table arranged to receive the cut stalks, substantially radially arranged stalk-supporting fingers supported above said table, means for revolving said fingers in substantial synchronism with the table, means for withdrawing said fingers from a shock, means for moving said supporting fingers away from above the table, and means for dropping the shock-forming table.

12. In a stalk harvester, the combination, with a stalk cutting means, of a rotary shock-forming table arranged to receive the cut stalks, a rotatable head arranged above said table, a series of movable arms carried by said head and having substantially radial inwardly projecting finger portions, means for revolving said head in substantial synchronism with the table, means for moving said arms on the head to withdraw their substantially radial finger portions from a shock, means for moving said rotatable head away from above the table, and means for dropping the shock-forming table.

13. In a stalk harvester, the combination, with stalk cutting means, of a rotary shock-forming table arranged to receive the cut stalks, substantially radially arranged stalk-supporting fingers supported above said table and independent thereof, means for revolving said fingers in substantial synchronism with the table, means for withdrawing said fingers from a shock, means for supporting the forward edge of the shock-forming table, a central pivotal support for said table, and means for vertically adjusting said central support.

14. In a stalk harvester, the combination, with stalk cutting means, of a rotary shock-forming table arranged to receive the cut stalks, substantially radially arranged stalk-supporting fingers supported above said table, means for revolving said fingers in substantial synchronism with the table, means for withdrawing said fingers from a shock, means for supporting the forward edge of the shock-forming table, a central pivotal support for said table, and means for vertically adjusting said central support.

15. In a stalk harvester, the combination, with a stalk cutting means, of a rotary shock-forming table arranged to receive the cut stalks, a rotatable head arranged above said table, a series of movable arms carried by said head and having substantially radial inwardly projecting finger portions, means for revolving said head in substantial synchronism with the table, means for moving said arms on the head to withdraw their substantially radial finger portions from a shock, means for supporting the forward edge of the shock-forming table, a central pivotal support for said table, and means for vertically adjusting said central support.

16. In a stalk harvester, the combination, with stalk cutting means, of a rotary shock-forming table arranged to receive the cut stalks, substantially radially arranged stalk-supporting fingers supported above said table and independent thereof, means for revolving said fingers in substantial synchronism with the table, means for withdrawing said fingers from a shock, means for moving said supporting fingers away from above the table, means for supporting the forward edge of the shock-forming table, a central support for said table, and means for vertically adjusting said central support.

17. In a stalk harvester, the combination, with stalk cutting means, of a rotary shock-forming table arranged to receive the cut stalks, substantially radially arranged stalk-supporting fingers supported above said table and independent thereof, means for revolving said fingers in substantial synchronism with the table, means for withdrawing said fingers from a shock, means for moving said supporting fingers away from above the table, means for supporting the forward edge of the shock-forming table, a central pivotal support for said table, and means for vertically adjusting said central support.

18. In a stalk harvester, the combination, with stalk cutting means, of a rotary shock-forming table arranged to receive the cut stalks, substantially radially arranged stalk-supporting fingers supported above said table, means for revolving said fingers in substantial synchronism with the table, means for withdrawing said fingers from a shock, means for moving said supporting fingers away from above the table, means for supporting the forward edge of the shock-forming table, a central pivotal support for said table, and means for vertically adjusting said central support.

19. In a stalk harvester, the combination, with stalk cutting means, of a rotary shock-forming table arranged to receive the cut stalks, a rotatable head arranged above said table, a series of movable arms carried by said head and having substantially radial inwardly projecting finger portions, means for revolving said head in substantial synchronism with the table, means for moving said arms on the head to withdraw their substantially radial finger portions from a shock, means for moving said rotatable head away from above the table, means for supporting the forward edge of the shock-forming table, a central pivotal support for said table, and means for vertically adjusting said central support.

20. In a stalk harvester, the combination, with stalk cutting means, of a rotary shock-forming table, and vertically adjustable means for supporting said table.

21. In a stalk harvester, the combination, with stalk cutting means, of a rotary shock-forming table, vertically adjustable means for supporting said table, and means, above said table, for supporting a shock independent of the table.

22. In a stalk harvester, the combination, with stalk cutting means, of a rotary shock-forming table having a conical upper face, and means supporting said table permitting tilting of the axis thereof from the vertical.

23. In a stalk harvester, the combination, with stalk cutting means, of a rotary shock-forming table, and means supporting said table permitting tilting of the axis thereof from the vertical.

24. In a stalk harvester, the combination, with stalk cutting means, of a rotary shock-forming table having a conical upper face, means supporting said table permitting tilting of the axis thereof from the vertical, and means, above said table, for supporting a shock independent of the table.

25. In a stalk harvester, the combination, with stalk cutting means, of a rotary shock-forming table, means supporting said table permitting tilting of the axis of rotation of the table from the vertical, and means, above said table, for supporting a shock independent of the table.

26. In a stalk harvester, the combination, with stalk cutting means, of a rotary shock-forming table having a conical upper face, a central pivotal support for the table, means for vertically adjusting said support, and means for supporting the table at one side of its center.

27. In a stalk harvester, the combination, with stalk-cutting means, of a rotary shock-forming table, a central pivotal support for the table, means for vertically adjusting said support, and means for supporting the table at one side of its center.

28. In a stalk harvester, the combination, with stalk cutting means, of a rotary shock-forming table having a conical upper face, a central pivotal support for the table, means for vertically adjusting said support, means for supporting the table at one side of its center, and means, above said table, for supporting a shock independent of the table.

29. In a stalk harvester, the combination, with stalk cutting means, of a rotary shock-forming table, a central pivotal support for the table, means for vertically adjusting said support, means for supporting the table at one side of its center, and means, above said table, for supporting a shock independent of the table.

30. In a stalk harvester, the combination, with stalk-cutting means, of a rotary shock-forming table arranged to receive the cut stalks, a mast, an arm carried by said mast and vertically and angularly movable thereon, a head carried by said arm, a series of arms carried by said head and each having a substantially radial, inwardly-projecting finger portion above the table, and means for rotating said head substantially synchronously with the table.

31. In a stalk harvester, the combination, with stalk cutting means, of a rotary shock-forming table arranged to receive the cut stalks, a mast, an arm carried by said mast and angularly movable thereon, a head carried by said arm, a series of arms carried by said head and each having a substantially radial, inwardly-projecting finger portion above the table, and means for rotating said head substantially synchronously with the table.

32. In a stalk harvester, the combination, with stalk-cutting means, of a rotary shock-forming table arranged to receive the cut stalks, a mast, an arm carried by said mast and angularly movable thereon, a cable attached at one end to said arm and at the other end to the mast at a higher point and angular outside the point of attachment to the arm, means for holding the arm over the table, a head carried by said arm, a series of arms carried by said head and each having a substantially radial, inwardly-projecting finger portion above the table, and means for rotating said head substantially synchronously with the table.

33. In a stalk harvester, the combination, with stalk cutting means and a rotary shock-forming table, of a reciprocating feeding device for engaging the stalks on the table, means for supporting the device movably, means for reciprocating said device, and means for yieldingly urging one portion of said device toward the axis of the table.

34. In a stalk harvester, the combination, with stalk cutting means and a rotary shock-forming table, of a reciprocating feeder bar arranged above the table and substantially parallel therewith in position to engage the butts of the stalks on said table, means for reciprocating said bar in lines tangential to the rotation of the table, and means for yieldingly urging said bar toward the axis of the table.

35. In a stalk harvester, the combination, with stalk cutting means and a rotary shock-forming table, of a reciprocating feeder bar arranged above the table in position to engage the butts of the stalks on said table, means for reciprocating said bar in lines tangential to the rotation of the table, and means for yieldingly urging said bar toward the axis of the table.

36. In a stalk harvester, the combination, with stalk cutting means and a rotary shock-forming table, of a reciprocating feeder-bar arranged above the table and substantially parallel therewith in position to engage the butts of the stalks on said table, means for reciprocating said bar in lines tangential to the rotation of the table, and means for yieldingly swinging one end of said bar toward the axis of the table.

37. In a stalk harvester, the combination, with stalk cutting means and a rotary shock-forming table, of a reciprocating feeder-bar arranged above the table in position to engage the butts of the stalks on said table, means for reciprocating said bar in lines tangential to the rotation of the table, and means for yieldingly swinging one end of said bar toward the axis of the table.

38. In a stalk harvester, the combination with stalk cutting means, of a rotary shock-forming table, a head rotatably supported independently above the table, controllable supporting fingers carried by the head and normally extending toward the axis of the table, and means for controlling the fingers.

39. In a stalk harvester, the combination with stalk cutting means, of a rotary shock-forming table, a head rotatably supported above the table, fingers carried movably by the head and normally extending toward the axis of the table, means for holding the fingers in normal position, and means for moving the fingers relatively to the head.

40. In a stalk harvester, the combination, with stalk cutting means and a rotary shock-forming table, of a head rotatably supported independently above the table, arms supported pivotally by the head and having fingers thereon normally extending toward the axis of the table, and means for moving the head away from above the table.

41. In a stalk harvester, the combination with stalk cutting means, a rotary shock-forming table, and means for supporting the table permitting the table to be dropped, of shock supporting means movably supported above the table, and means enabling the shock supporting means to move the shock away from above the table after the table is dropped from a shock.

42. In a stalk harvester, the combination with stalk cutting means, a rotary shock-forming table, and means for supporting the table permitting the table to be lowered, of shock-supporting means movably supported above the table, and means automatically acting, when the table is lowered from the shock, to move the shock-supporting means to carry the shock away from above the table.

43. In a stalk harvester, the combination of stalk cutting means, and a rotary shock-forming table, with means for supporting and shifting the table vertically, means including fingers movably supported independently of and above the table for supporting a shock independent of the table, means for controlling the fingers, and means for revolving the fingers in substantial synchronism with the table.

44. In a stalk harvester, the combination of a frame, a mast mounted on the frame, a mast arm supported by the mast, a head rotatably supported by the arm, a plurality of controllable arms supported pivotally by means of the head and carrying shock-suspending fingers that normally extend toward the axis of the head, and means supported by the mast arm for controlling the plurality of arms, with a rotatable shock-forming drop table on the frame below and independent of the head and the fingers, and stalk cutting means on the frame in advance of the table.

45. In a stalk harvester, the combination with stalk cutting means, of a rotary shock forming table having a conical upper face, supporting means for the table, means for adjusting the supporting means vertically, and means above said table for supporting a shock independent of the table.

46. In a stalk harvester, the combination with stalk cutting means, of a rotary shock-forming table having a crowning top provided with upturned flanges, means for adjusting the height of the table, and means above said table for supporting a shock independent of the table.

47. In a stalk harvester, the combination of stalk cutting means, a rotary shock-forming table, a head supported above and independently of the table and rotatable about the axis thereof, and controllable arms carried by means of the head and having supporting fingers thereon normally extending toward the axis to be moved outwardly therefrom, with means for operatively connecting the head with the table to rotate the head substantially in synchronism with the table.

48. In a stalk harvester, the combination with stalk-cutting means, and a rotary vertically movable shock-forming table, of a movable guide arranged above the table and supported independently thereof, a head rotatable on the guide, controllable arms pivoted to the head and having shock-supporting fingers thereon normally extending toward the axis of the head, means for lowering the table, and means for moving the guide away from above the table.

49. In a stalk harvester, the combination, with stalk cutting means and a rotary shock-forming table, of a rotary shock-support arranged above and supported independently of the table, said shock-support comprising a plurality of laterally-withdrawable controllable fingers adapted to become embedded in a shock in formation on the table and to support the shock independently of the table, and means for controlling the fingers for supporting the shock.

50. In a stalk harvester, the combination, with stalk cutting means, a shock-forming table, and means for bodily lowering the table, of a shock-support arranged above and movably supported independently of the table, said shock-support comprising a plurality of laterally-withdrawable shock-supporting fingers adapted to become embedded in a shock in formation on the table and to support the shock independently of the table, and means for moving the shock-support.

51. In a stalk harvester, the combination, with stalk cutting means, of a shock-supporting and downwardly movable table on which to form a shock of the stalks, means movably supported above the table for supporting the shock independently of the table and moving the shock away from above the table when the table is lowered, and means for controlling the lowering of the table.

52. In a stalk harvester, the combination, with stalk cutting means, a shock-supporting table on which to form a shock of the stalks, and means for supporting and lowering the table, of movable means for maintaining the formed shock above the table independently thereof when the table is lowered, and means for moving the movable means for moving the shock away from above the lowered table without elevating the shock.

53. In a stalk harvester, the combination with stalk cutting means, of a rotary shock-forming table having a crowning top, means for supporting and lowering the table, and rotary means above said table for supporting a shock independently of the table when the latter is lowered.

54. In a stalk harvester, the combination, with stalk cutting means, a rotary shock-forming table, and means for supporting and lowering the table, of bodily movable means supported above the table for supporting a shock independently of the table when the table is lowered, and means enabling the said movable means to automatically carry the supported shock away from above the lowered table.

55. In a stalk harvester, the combination with stalk cutting means, a rotary shock-forming table, and means for rotatably supporting the table, of means for supporting and lowering the table-supporting means with the table thereon, and movable means above said table for supporting and carrying a shock independently of the table when the table is lowered.

56. In a stalk harvester, the combination, with stalk cutting means, a supporting and lowering means, and rotary and bodily movable shock-supporting means above the plane of said supporting and lowering means for independently supporting and carrying a shock, of a shock-forming table rotatably mounted on the supporting and lowering means independently of the shock-supporting means.

In witness whereof, I have hereunto set my hand and seal at Indianapolis, Indiana, this 28th day of June, A. D. one thousand nine hundred and six.

ARTEMUS N. HADLEY. [L. S.]

Witnesses:
THOMAS W. MCMEANS,
ARTHUR M. HOOD.